United States Patent
Huang et al.

(10) Patent No.: US 10,239,202 B1
(45) Date of Patent: Mar. 26, 2019

(54) ROBOT INTERACTION SYSTEM AND METHOD

(71) Applicant: Play-i, Inc., San Mateo, CA (US)

(72) Inventors: Leisen Huang, San Mateo, CA (US);
Chris Rettstatt, San Mateo, CA (US);
Vikas Gupta, San Mateo, CA (US);
Kevin Liang, San Mateo, CA (US);
Steven Levis, San Mateo, CA (US);
Anthony Fudd, San Mateo, CA (US);
Tim Reardon, San Mateo, CA (US)

(73) Assignee: Play-i, Inc., San Mateo, CA (US)

( * ) Notice: Subject to any disclaimer, the term of this patent is extended or adjusted under 35 U.S.C. 154(b) by 0 days.

(21) Appl. No.: 16/132,162

(22) Filed: Sep. 14, 2018

Related U.S. Application Data

(60) Provisional application No. 62/558,774, filed on Sep. 14, 2017.

(51) Int. Cl.
| | | |
|---|---|---|
| *G01C 21/00* | (2006.01) | |
| *B25J 9/00* | (2006.01) | |
| *B25J 11/00* | (2006.01) | |
| *B25J 13/06* | (2006.01) | |
| *B25J 13/00* | (2006.01) | |

(52) U.S. Cl.
CPC ........... *B25J 9/0081* (2013.01); *B25J 11/001* (2013.01); *B25J 13/006* (2013.01); *B25J 13/06* (2013.01)

(58) Field of Classification Search
CPC ...... B25J 9/0081; B25J 13/006; B25J 11/001; B25J 13/06
See application file for complete search history.

(56) References Cited

U.S. PATENT DOCUMENTS

| | | | |
|---|---|---|---|
| 2005/0043898 A1* | 2/2005 | Linsen | G01J 3/52 702/22 |
| 2013/0073387 A1* | 3/2013 | Heath | G06Q 50/01 705/14.53 |
| 2018/0089565 A1* | 3/2018 | Yufik | G06N 3/08 |

* cited by examiner

*Primary Examiner* — Ian Jen
(74) *Attorney, Agent, or Firm* — Jeffrey Schox; Diana Lin

(57) ABSTRACT

A method for robot interaction, preferably including: receiving a user input, determining a robot-associated response based on the user input, and presenting the robot-associated response. A system, preferably including: a robot, a conversation client, and a response module.

20 Claims, 12 Drawing Sheets personalities

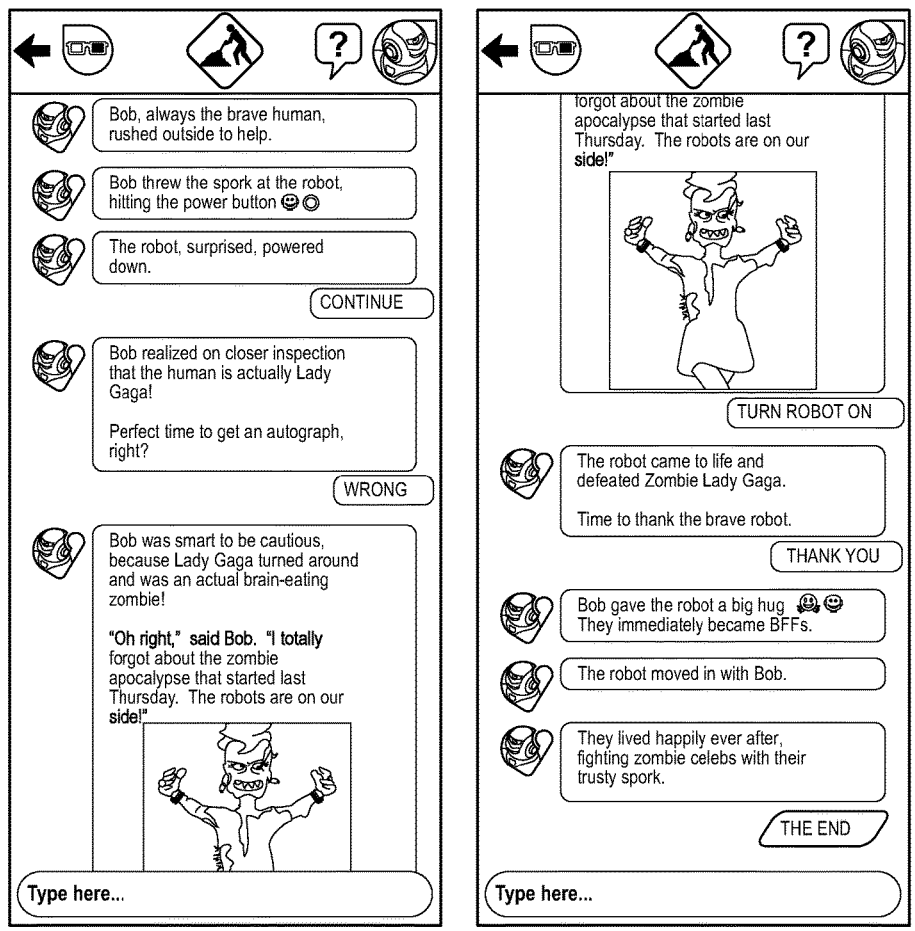

ROBOT INTERACTION SYSTEM AND METHOD

CROSS-REFERENCE TO RELATED APPLICATIONS

This application claims the benefit of U.S. Provisional Application Ser. No. 62/558,774, filed on 14 Sep. 2017, which is incorporated in its entirety by this reference.

This application is related to prior U.S. application Ser. No. 15/636,439 filed 28 Jun. 2017, which is a continuation of U.S. application Ser. No. 15/299,292, filed 20 Oct. 2016, which is a continuation of U.S. application Ser. No. 14/737,347, filed on 11 Jun. 2015, which claims the benefit of U.S. Provisional Application Nos. 62/011,478 filed 12 Jun. 2014, and 62/015,969 filed 23 Jun. 2014, all of which are incorporated in their entireties by this reference.

TECHNICAL FIELD

This invention relates generally to the robotics field, and more specifically to a new and useful system and method for toy robot interaction in the robotics field.

BACKGROUND

Conversational interaction can be a beneficial and/or desirable aspect of user interaction with a robot. However, many robots lack the computational resources to adequately engage in such interactions. Thus, there is a need in the robotics field to create a new and useful robot interaction system and method. This invention provides such a new and useful system and method.

BRIEF DESCRIPTION OF THE FIGURES

FIGS. 12A-12D are an example of a response sequence.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 2:
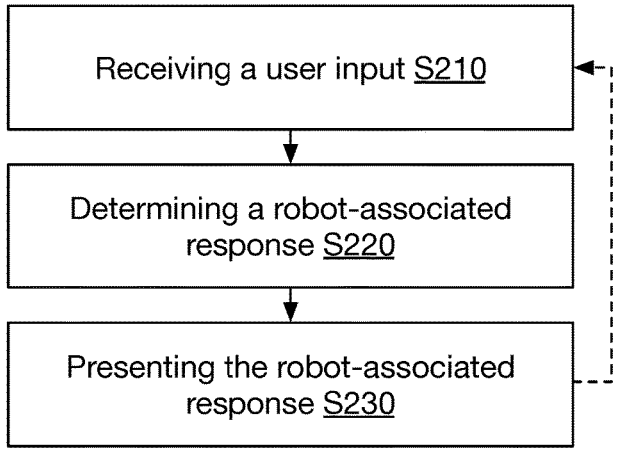
FIG. 2 is a schematic representation of the method.

As shown in FIG. 2, a method 2 for robot interaction preferably includes: receiving a user input S210, determining a robot-associated response S220 (e.g., based on the user input), and presenting the robot-associated response S230. The method functions to facilitate organic interaction between the robot and a user using natural-language conversation and physical robot animations. For example, the method can create the illusion that the robot is both "chatting" with the user through the conversation client and physically reacting to the user's words of its own volition.

In one variation, the method for robot interaction includes: receiving a user input at a conversation client on a user device, determining the response based on the user input at the user device, and at the user device, coordinating robot animation to present the response to the user. In one example, the user input includes natural language voice and/or text, symbols (e.g., emojis, emoticons, etc.), gifs, and/or links (e.g., URLs), and the response can include: displaying a visual or textual response (e.g., natural language text, symbols, gifs, links, etc.) at the client in association with an icon associated with the robot (e.g., using a chat bot representing the robot) and/or in conjunction with a robot animation (e.g., motion, sounds, light displays, etc.). In a second example, the user input includes spoken language (e.g., received by one or more audio sensors of the robot and/or user device), the user input is interpreted at the user device (e.g., wherein an interpretation module of the client includes a voice recognition submodule), and the response is presented as a spoken language output (preferably emitted by the robot, but additionally or alternatively by the user device and/or any other suitable devices). In some specific examples of this example, the conversation may not require any user interaction with the client (e.g., wherein the user speaks the input to the robot, the robot transmits information associated with the input to the client, the client transmits information associated with a response to the robot, and the robot speaks the response to the user), thereby further enhancing the user's perception that the conversation is being held with the robot (e.g., rather than with the client). Client content display can additionally or alternatively be coordinated with robot animation. For example, the client can display a "typing" video animation (e.g., bouncing periods) while the client concurrently instructs the robot to perform a "typing" robot animation (e.g., looking up, playing typing sounds, etc.). In a second variation, the client can display text corresponding to (e.g., matching, complimentary to) robot speech. However, the method can otherwise create the illusion that the robot is interacting with the user of its own volition.

2. Benefits.

This method can confer several benefits over conventional robotic control methods. First, the method can simulate natural conversation and interaction, which can facilitate increased user engagement with the robot itself, the robot content (e.g., educational content, and/or the robotic platform. Second, in some variations of the system and method, the structure and/or learning capabilities of the response module can be limited (e.g., by permissions, the response module data structure, etc.), which can enable tighter control over the robot content. This control can be desirable in some applications (e.g., children-facing applications) to meet regulatory requirements. Third, in some variations, the same client (e.g., application) controls both the user device and the robot, which allows the robot's textual and animation responses to be easily updated by simply updating the client (e.g., instead of updating the robot, which can be difficult due to connectivity and security issues). However, the method and system can confer any other suitable benefit.

3. System.

Figure 1:
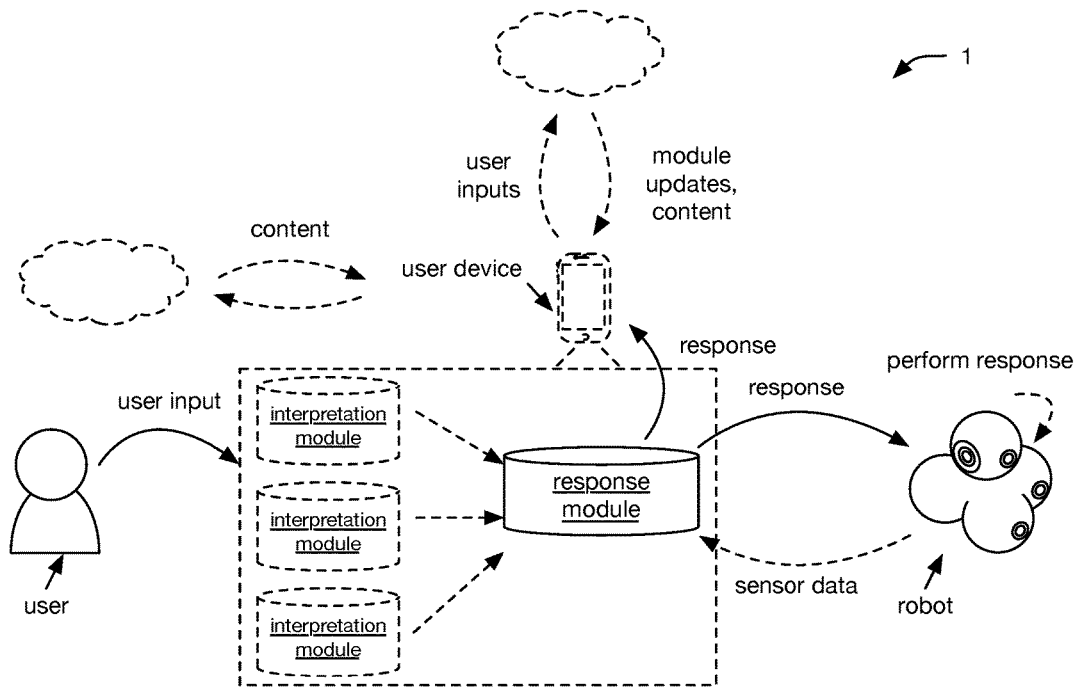
FIG. 1 is a schematic representation of the system.

As shown in FIG. 1, the method 2 is preferably performed with a system 1, which preferably includes a robot, conversation client, and response module. The system can optionally include one or more interpretation modules, learning modules, or any other suitable modules. The modules can be hosted by one or more user devices, remote computing systems (e.g., distributed computing system, server system, etc.), or any other suitable computing system. However, the method can be performed by any other suitable system.

The robot of the system functions to perform robot animations. The robot is preferably a toy robot, but can be any other suitable robot. The robot preferably includes robot outputs (e.g., drivetrains, head or appendage actuation systems, lights, speakers, etc.), robot inputs (e.g., light sensors, microphones, motor encoders, optical sensors, range-finding systems, motion sensors, etc.), communication systems (e.g., radios, transceivers, receivers, transmitters, or other hardware for WiFi, NFC, Bluetooth, RF, cellular, or any other suitable protocol), processing systems (e.g., CPU, GPU, microprocessor, etc.), on-board memory (e.g., Flash, RAM, etc.) for storing remote control instructions, program instructions for predefined subroutines, or other data, or any other suitable subsystem or subcomponent.

The outputs can include motion devices, visual outputs, audio outputs, and/or any other suitable outputs. The outputs are preferably arranged on the robot, but can alternatively be remote outputs controlled by the robot, and/or be arranged in any other suitable location. The motion devices can include controllable mechanical elements such as motorized wheels (e.g., a drivetrain), motorized appendages (e.g., head, legs, feet, arms, hands, tail, etc.), motorized accessories (e.g., ball launcher, eyes, drawing tool, etc.), haptic feedback (e.g., vibrator motors), and other suitable motion devices. The motion devices can additionally include motorized mounting points configured to permanently or removably retain robot accessories, wherein the motorized mounting points can actuate about a rotational axis, along a longitudinal axis, or in any other suitable direction. The motorized mounting points can retain the accessories along the rotational axis, wherein the accessories can be freely rotatable relative to the mounting points, statically coupled to the mounting point, rotatable in a first angular direction about the mounting point (e.g., wherein the accessory or mounting point is ratcheted), or otherwise coupled to the mounting point. However, the robot can additionally or alternatively include any other suitable motion devices. The visual outputs can include controllable lighting systems, graphical displays, and/or any suitable visual displays. In one example, a visual output includes a set of individually indexed light emitting elements (e.g., wherein each light emitting element can be individually controlled by a processor of the robot). The light emitting elements can be LEDs, OLEDs, and/or any other suitable light emitting element. However, the robot can include any other suitable visual output. The audio outputs can include speakers, transducers, and/or any other suitable mechanism capable of generating sound. However, the robot can additionally or alternatively include any other suitable outputs.

The inputs of the interactive robot preferably function to receive user inputs at the robot, receive inputs from other robots, receive inputs from auxiliary sensors remote from the robot, measure parameters of the ambient environment, measure robot operational parameters, or provide any other suitable information. The interactive robot can respond to the inputs according to the programming. The interactive robot can additionally or alternatively stream the input information to a remote user device, wherein the remote user device can process, store, or otherwise handle the input information.

The inputs can include one or more sensors, but can alternatively or additionally include interfaces for communicatively coupling with one or more sensors (e.g., connectors, etc.). Sensor inputs can include motion detector, distance sensors, imaging systems (e.g., CCD sensor, CMOS sensor, camera, etc.), depth cameras (e.g., structured light sensor systems), inertial sensors (e.g., inertial measurement units, accelerometers, gyroscopes, magnetometer, tilt sensors, etc.), force sensors (e.g., pressure sensors, etc.), touch sensors (e.g., a set of electrodes, etc.), user inputs (e.g., buttons, analog controls, etc.), and/or any suitable type of input. The sensors can additionally include system monitoring sensors that function to monitor robot operational parameters, ambient environment parameters, or any other suitable parameters. Examples of monitoring sensors include motor monitoring systems (e.g., rotary encoders, mechanical encoders, magnetic encoders, optical encoders, resolvers, Hall effect sensors, back EMF monitoring systems, etc.), light sensors, audio sensors (e.g., microphones), temperature sensors, and pressure sensors, but the robot can additionally or alternatively include any other suitable sensors.

The communication system(s) of the robot preferably functions to transfer information between the robot and a data endpoint. The data endpoint is preferably associated with the conversation client (e.g., user device implementing the conversation client), but can additionally or alternatively include remote computing systems (e.g., Internet server) and/or any other suitable devices. The communication system is preferably a transceiver, but can alternatively be a receiver, transmitter, or be any other suitable communication system. The communication system can be wired or wireless. The communication system can be an IR system, RF system, beacon system (e.g., ultrasound, RF), light modulation system, NFC system, Wi-Fi system, GSM system, Bluetooth system, mesh system, cellular system, Ethernet system, powerline communication system, and/or be any other suitable communication system.

The processing system preferably functions to control the robot outputs, communication system, and/or other components. The processing system can independently and/or automatically control the robot based on sensor measurements and/or stored control instructions. The processing system can additionally or alternatively operate the robot based on control instructions received from the communication client, user device, and/or other remote control system. The processing system can additionally or alternatively adjust or otherwise modify the received control instructions (e.g., based on the stored robot personality, sensor measurements, etc.). The processing system can be a processor, microprocessing system, GPU, CPU, and/or be any other suitable processing system. The processing system can additionally include digital memory (e.g., flash memory, RAM, etc.) that functions to permanently or temporarily store information. The stored information can be control instructions (e.g., a robot personality), sensor measurements or other input, identifier information (e.g., robot identifier information, user identifier information, user device identifier information, etc.), or be any other suitable information. The processing system can include a local control system that functions to control the robot independent of the conversation client, and can additionally include a remote control system that functions to control the robot based on control instructions received from the conversation client. The remote control system is preferably accessed through a programming interface application, but can alternatively be accessed through a remote cloud computing system or accessed in any other suitable manner. The local control system can store inputs, process programming configuration, direct output control, and provide any suitable form of control.

The robot preferably includes a power storage unit that functions to store energy and supply power to active robot components. The power storage unit is preferably arranged on-board the robot, but can alternatively be remote. The power storage unit can be a primary battery, secondary battery (rechargeable battery), fuel cell, and/or any other suitable power supply. However, the robot can additionally or alternatively include any other suitable elements in any suitable arrangement.

The system can include one or more robots. A robot of the system can be associated with a user account, wherein the user account can track historic user inputs associated with the robot from a user, derivative data extracted from the user inputs, user information (e.g., birthdates), robot personality selection(s), permissions, or any other suitable user-associated information. The robot (and/or conversation client) can be associated with one or more robot personalities (e.g., robot chat personality), which preferably functions to change robot operation parameters. For example, different robot personalities can be associated with different response parameters (e.g., intensity, speed, etc.; example shown in FIG. 8H), notification frequencies, response modules, response libraries (e.g., including different written phrases, nonverbal robot and/or user device animations, etc.), animation rules, content (e.g., games, third-party content, robot stories, etc.), or any other suitable data. The robot personality can be a default personality, a user-selected personality, an automatically generated personality (e.g., based on historic user interactions or instructions), or be otherwise determined. The robot personality can be stored by the robot (e.g., wherein the robot personality identifier can be transmitted to the user device upon user device connection with the robot), stored by the client, stored by the user account, or be otherwise stored.

The robot personality can additionally or alternatively function to supply behavioral pattern directives associated with robot operation (e.g., operation independent of other devices, such as independent of user interaction with a conversation client, independent of client and/or user device state, etc.). For example, the robot personality can control robot behavior when a chat session is not active (e.g., user has not initiated chat, previous chat session has been ended by the user and/or timed out, etc.). The personality configuration preferably characterizes the type of actions and control instructions that are executed by the robot. The personality configuration can define output responses to inputs (e.g., determined by the robot, such as independent of the client). For example, the personality configuration can specify that the robot should perform a dance when it detects a change in the lighting, sound an alarm when it detects motion, should avoid objects when driving, or perform any suitable logic. The personality configuration is preferably updatable, and preferably evolves or otherwise updates according to interactions and programming received from the programming interface application. The personality configuration preferably initializes in a new instance of an interactive robot as a base personality. In one preferred implementation, base personality defines default or minimal response logic, which functions to simulate an uneducated/simple new robot. The personality configuration preferably updates through robot and/or application interactions. Over time, the personality configuration updates to provide customized response logic at least partially set through inter-actions of a user. At least a portion of the personality configuration is stored and maintained on the interactive robot such that the robot can conform to personality-based behaviors independent of the application (e.g., when the robot is disconnected from or not controlled by a user device). The personality configuration can additionally or alternatively be stored and managed remotely (e.g., by the application or in a remote cloud platform). The robot personality that affects activity associated with the chat client (e.g., chat client responses, robot animations during chat, etc.) and the robot personality that affects robot operation independent of the chat client are preferably linked (e.g., are the same robot personality, are parts of the same robot personality, etc.), such as wherein there is a one-to-one correspondence between a set of chat-associated robot personalities and chat-independent robot personalities, but can additionally or alternatively be selected independently and/or otherwise determined.

The client of the system functions to receive user inputs, and can additionally determine the robot-associated responses to the user inputs. The client can additionally present the robot-associated responses (e.g., the written responses) and/or control the robot according to the robot-associated responses (e.g., instruct the robot to perform the non-verbal responses). The client can additionally manage the user account, store the response module for the user account or robot personality, and/or perform any other suitable function. The client is preferably a native application executing on a user device, but can alternatively be a web application or be any other suitable application. The user device preferably includes one or more input devices (e.g., touchscreens, microphones, cameras, motion sensors, etc.), output devices (e.g., screens, speakers, vibration motors, etc.), communication systems (e.g., radios supporting cellular, WiFi, mesh, BLE, RF, NFC, or any other suitable communication protocol, etc.), processing systems (e.g., CPU, GPU, etc.), or any other suitable component. Examples of user devices that can be used include smartphones, tablets, laptops, smartwatches, or any other suitable personal user device.

The response module of the system functions to determine the robot-associated response. The response module is preferably specific to a robot personality (e.g., globally shared across all robots with the same robot personality), wherein different personalities are associated with different response modules, but can alternatively or additionally be universal to all robots (e.g., wherein a robot, robot personality, or other population segment can have selective access to different portions of the response module), specific to a user population (e.g., sharing a user parameter, such as common language, robot personality, user history, etc.), specific to a user account, specific to a parental setting, specific to a robot, or otherwise associated with users or robots.

The response module is preferably stored and/or used by the client (e.g., on the user device), but can alternatively be stored at the remote computing system, the robot, or by any other suitable system. In one example, a copy (e.g., version, such as a condensed and/or abridged version) of the response module (e.g., a parse tree index, such as an AIML tree index) is stored at the client, while the main response module(s) (e.g., graph, such as an AIML graph) are generated and updated at the remote computing system (e.g., wherein the remote computing system generates the copy based on the main response module, and transmits the copy to the client). For example, the response module can be updated on a daily basis with news, and upcoming events. All or a portion (e.g., a subset of the graph, tree, tree index, etc.) of the updated response module can be transmitted to the client at a predetermined frequency, upon request, or at any other time. This can reduce processing resources and load time (e.g., by eliminating the need to the parse content and build the graph on client side), and minimize required communication resources (e.g., because the copy can be smaller than the full response module). In variations in which a portion of the response module is transmitted, the client preferably updates the response module based on the transmitted portion (e.g., combines the transmitted portion with an unchanged subset of the prior response module to generate the updated response module), such as by combining an updated subtree with a set of prior (not updated) subtrees as an overall tree. However, the response module can be otherwise stored and updated. The response module can be updated without updating the client, or be updated with the client.

The response module can include a set of rules, decision trees, state machines, decision sequences, databases (e.g., lookup tables, etc.), neural networks, Bayesian methods, genetic programs, support vectors, fuzzy networks, regression methods, classification methods, heuristics, equations, selection, instance-based methods, regularization methods, and/or deterministics, use any other suitable method, and/or have any other suitable structure, taxonomy, and/or ontology.

The response module preferably maps user input sequences to response sequences, more preferably response identifiers but alternatively the underlying programmatic instructions themselves. User input/response sequences can be predetermined, determined upon new conversation topic detection, determined ad hoc, or otherwise determined. The robot response sequences (e.g., those performed by the robot) are preferably stored on-board the robot, and are performed in response to receipt of a performance request with the response sequence identifier from the user device. The client response sequences (e.g., those performed by the client at the user device) can be stored by the user device, retrieved (e.g., in real- or near-real time) from a remote computing system, or otherwise determined. For example, image- or video-based responses (e.g., memes, gifs, stickers, emojis) can be retrieved from the remote computing system, while text can be generated or retrieved from the client. However, the response content can be otherwise determined.

Figure 3:
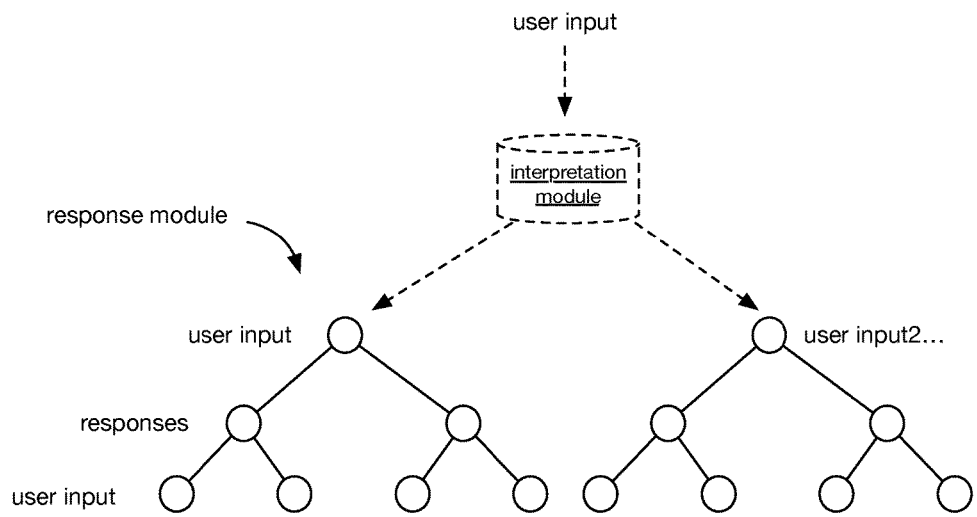
FIG. 3 is an example of a response module structure.

In one variation (e.g., as shown in FIG. 3), the response module includes a tree index, wherein each predetermined user input pattern (parent node) is associated with one or more predetermined robot-associated responses or templates (child nodes of the user input patterns). The predetermined user input pattern can, in turn, be a child node of a prior robot-associated response. In one example, the response module can include structured data (e.g., AIML) with multiple categories arranged in a tree index. In a specific example, the tree can be defined using AIML (e.g., AIML 2.0), wherein each pattern can be a parent node and each template can be a child node. Each category can include a set of patterns, each mapped to a set of associated responses or response templates. The received user input can be matched to a category based on the user input pattern, and a template associated with the pattern can be selected and populated by the response module. The tree can be broken into subgroups, organized by topic, robot personality, or any other suitable parameter, which can decouple content creation while retaining the capability of merging content into a coherent chat conversation. Additionally or alternatively, the response module can include one or more tree indices (e.g., integrated into a master tree). This can enable the response module to run on the limited computing power or memory of a mobile user device or robot. However, the tree index can be otherwise defined. In a second variation, the response module includes a lookup table, wherein the robot-associated response is the response mapped to the user input in the lookup table. In a third variation, the robot-associated response can be the response with the highest score based on the user input content and type, historic responses that have been presented to the user, the current robot operation context, or other data. In a fourth variation, the robot-associated response can be randomly selected. However, the response module can otherwise determine the robot-associated response based on the user input.

The response module can be generated based on user responses to automatically presented robot-associated responses, historic user inputs (e.g., for one or more users or user accounts), third-party resources, or based on any other suitable data. The response module can be generated: manually, semi-automatically (e.g., wherein suggested input-response connections are manually confirmed and added to the response module), iteratively (e.g., based on user reactions to a given response), automatically (e.g., using supervised learning, unsupervised learning, reinforcement learning, deep learning, etc.), or otherwise generated. For example, the response module can be generated using supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), backward chaining, forward chaining, and any other suitable learning style. The response module can be generated or updated periodically, in response to trigger event occurrence (e.g., when a user boredom score exceeds a threshold value), or at any other suitable time. The response module is preferably remotely generated (e.g., at the remote computing system) and pushed to the client, but can alternatively be locally generated (e.g., by the client or robot), or otherwise generated. In one example, the response module is generated by the user (and/or a different user), such as using a response module creation client (e.g., running on the user device and/or a different user device), such as a client that enables a user to create new response modules (e.g., corresponding to new personalities) and/or edit existing response modules (e.g., user-created response modules, predefined response modules, etc.). The response module can be static, dynamically updated, dynamically changed (e.g., according to a schedule, in response to occurrence of a trigger event), or otherwise updated.

The system can additionally include one or more interpretation modules, which function to convert user inputs into computational meaning for use by the response module. The machine-usable data can include: keywords, probabilities (e.g., for a given input class), scores, or any other suitable format. Each response module can be associated with one or more interpretation modules. The interpretation module(s) are preferably stored by the client (e.g., at the user device), but can alternatively be stored by the robot, the remote computing system (e.g., wherein the user input or parameters thereof are forwarded to the remote computing system for interpretation), or otherwise stored. Each interpretation module is preferably associated with and processes one user input type (e.g., the system includes different interpretation modules for text, emojis, images, videos, audio, and robot manipulation, etc.), but can be associated with and process multiple user input types. The interpretation module can include: image analysis methods (e.g., computer vision methods, such as object recognition, identification, detection, pose estimation, facial recognition, SRT), video analysis methods (e.g., ego-motion analysis, tracking, optical flow), keyword identification methods (e.g., including lexicons, parsers, and rule sets), natural language processing methods for verbal inputs such as written inputs or spoken inputs (e.g., including lexicons, parsers, grammar rules, semantic interpretation systems, such as naïve semantics or stochastic semantic analyses), or any other suitable interpretation method. However, the system can include any other suitable component.

4. Method.

Receiving a user input S210 preferably functions to indicate user desire to interact with the robot, and/or to receive a basis from which a robot-associate response can be determined. The user input is preferably received at the client (e.g., at the user device), but can alternatively be received at the robot, the remote computing system (e.g., and transmitted to the client), an auxiliary system (e.g., connected speaker system, such as Google Home™ or Alexa™), or received at any other suitable system. The user input can be received from: the user, the robot, the remote computing system, the auxiliary system (e.g., connected security system), a social networking system (e.g., Facebook), a third-party content system (e.g., a news system), or any other suitable source. The user input can be: verbal communication (e.g., oral communication, written communication), nonverbal communication (e.g., gestures, user motion, etc.), images (e.g., emoji, images, gifs, etc.), video, sounds, content (e.g., articles, etc.), links, code, or any other suitable information. The user input is preferably received in association with a previously-presented robot-associated response (e.g., wherein the user input is a response to the previously-presented robot-associated response), wherein the user input can be interpreted based on said previously-presented response. However, the user input can be received independent of a previously-presented robot-associated response (e.g., when no robot-associated response was previously presented, when the user input is not a predefined or acceptable response to the previously presented robot-associated response, etc.), or otherwise received.

In a first variation, the user input is received at the conversation client (e.g., implementing one or more conversation modules, such as modules including one or more response modules and/or interpretation modules) running on the user device. In a first embodiment, the user input includes a verbal input (e.g., text) or an input that is associated with verbal tags or keywords (e.g., emojis, gifs, images, videos, etc.), wherein the associated tags or keywords can be pre-assigned (e.g., by the conversation client) or automatically determined (e.g., using image or video analysis techniques). The user input can be interpreted using the respective interpretation module (e.g., for the input type), wherein the results are fed to the response module, or be otherwise processed. In a second embodiment, the user input includes user gestures sampled by user device sensors. In one example, the user gesture is captured by the user device camera, wherein the camera feed is analyzed (e.g., using object recognition, pose estimation, object tracking, etc.) to characterize the gesture and assign keywords or values to the gesture. In a second example, the user gesture is captured by the user device motion sensors (e.g., accelerometer, IMU, gyroscope, etc.), wherein the user device motion patterns can be analyzed (e.g., using pattern recognition techniques, etc.) to characterize the gesture. However, the user input can be otherwise received.

In a second variation, the user input is received at the robot, wherein the user input can include button presses, robot manipulation (e.g., lifting the robot, moving the robot side to side, etc.), user gesture detection (e.g., using on-board robot light sensors, cameras, etc.), verbal user command detection (e.g., using on-board robot microphones, etc.), or any other suitable input. The robot-received user input is preferably transmitted to the processing system (e.g., conversation client, remote computing system) for interpretation, but can be otherwise managed. However, the user input can be received in any other suitable manner.

Determining a robot-associated response S220 functions to conduct a conversation with the user via auditory, textual, or physical methods, and can function to simulate the robot as a conversational partner. The response is preferably determined based on the user input (e.g., as described above, such as regarding S210), but can additionally or alternatively be determined based on any other suitable information. The robot-associated response is preferably determined by the response module, but can alternatively be determined by any other suitable system. The response module is preferably hosted by the conversation client receiving the user input, but can alternatively be hosted by the remote computing system, the robot, or any other suitable processing system, wherein the user input can be transmitted to said processing system.

Figure 8A:
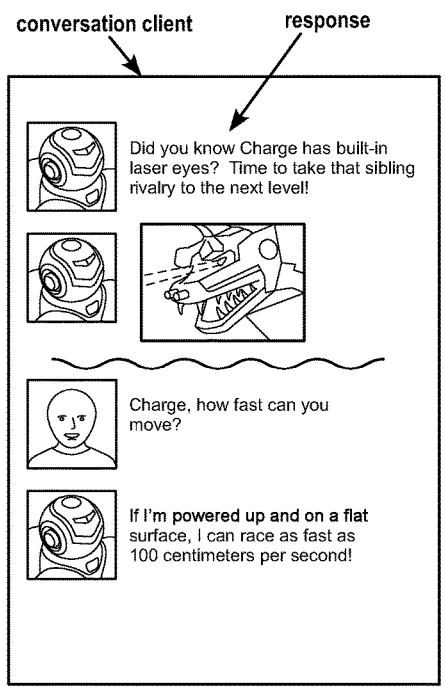
FIGS. 8A-H are examples of visual responses presented at the conversation client.
Figure 8B:
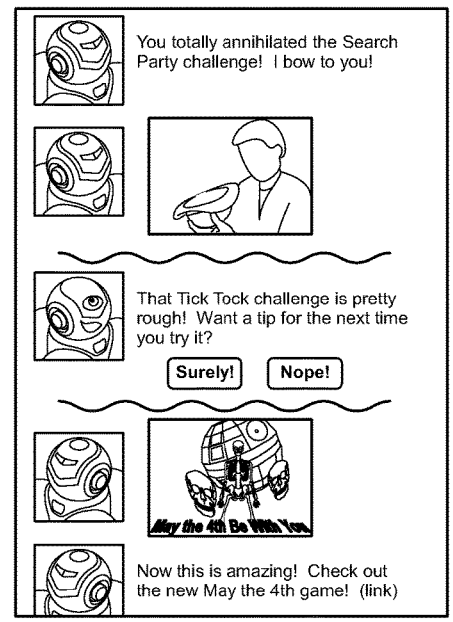
Figure 8C:
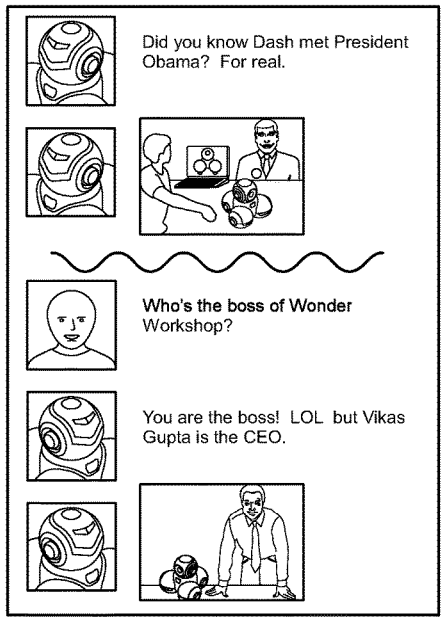
Figure 8D:
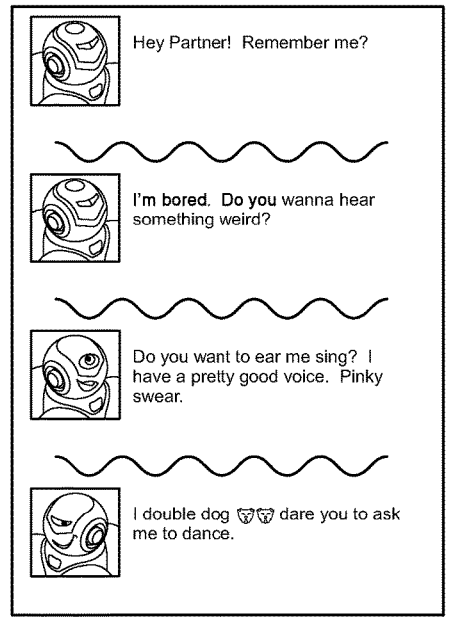

The responses can be for the robot, the user device (examples shown in FIGS. 8A-8H), an auxiliary system, a third-party system (e.g., social networking system), a combination thereof, or for any other suitable system. One or more responses for one or more output systems (e.g., client, robot, auxiliary system, etc.) can be determined for each user input instance. The responses can be auditory, textual (e.g., text, emojis, links, etc.), visual (e.g., images, gifs, videos, etc.), physical actuation commands (e.g., robot animations, user device actuation, etc.), nonverbal, games (e.g., conversation client routines, games such as described below, etc.), facts (e.g., as shown in FIGS. 8A and/or 8C), secondary clients, or have any other suitable format. Examples of robot animations can include motion sequences, natural language speech (e.g., prerecorded, automatically generated, etc.), sounds, light sequences, or any other suitable robot subsystem operation. Other examples of responses include: singing, making casual remarks about a user's input, agreement with the user input, disagreement with the user input, curiosity about a sensed object or received input, excitement, greeting (e.g., a new user, a user identified in an earlier session, etc.), goodbye, offering to help, responding to input classified as funny, expressing interest, expressing surprise, expressing boredom, expressing annoyance, making sounds, announcing a point in a story (e.g., beginning, middle, "not over," end), or any other suitable response. In a specific example, the robot speech can include a predetermined library of natural language speech clips (e.g., prerecorded clips), each identified by a clip identifier, wherein the clips are played by the robot in response to receipt of a clip performance command from the user device (e.g., when the response module determines the clip should be presented in response to the user input).

Figure 5:
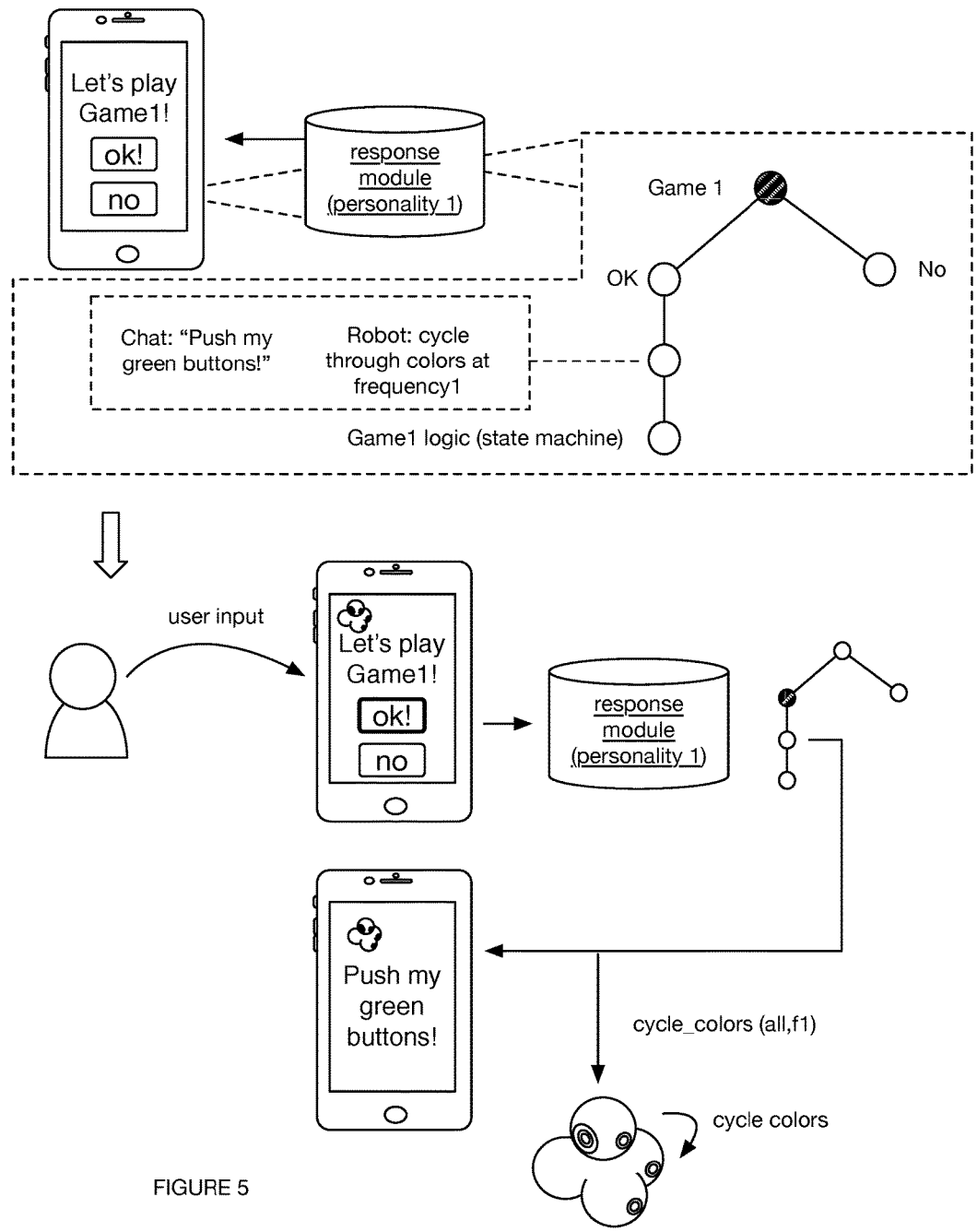
FIGS. 5 and 6 are examples of the method implemented using examples of the system.
Figure 6:
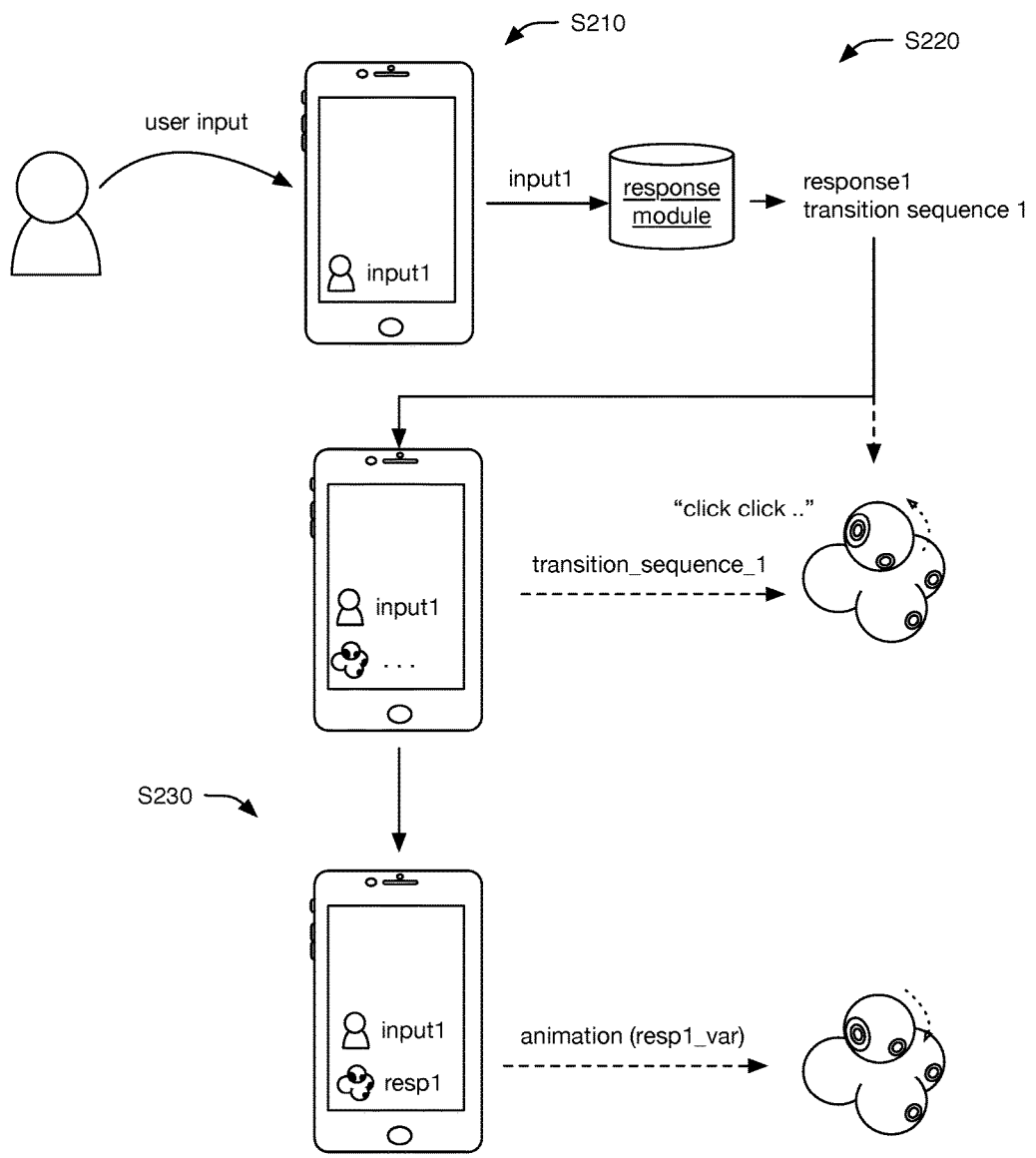

In one variation, the robot commands can include a robot subroutine call (examples shown in FIGS. 5 and 6). The subroutine call (and/or associated variable values) can be transmitted to the robot, wherein the robot can execute the program instructions, stored by the robot, that are associated with the subroutine call. In a second variation, the robot commands can include the program instructions cooperatively forming a subroutine, wherein the robot program instructions can be transmitted (e.g., as a package, streamed in response to robot sensor signals satisfying a transition condition, etc.) to the robot for execution. In a third variation, the robot commands can include robot subsystem variable values only. In some examples, the subroutine call includes operating the robot based on a robot program (e.g., state machine), such as described in U.S. application Ser. No. 15/636,439, filed 28 Jun. 2017 and titled "System and Method for Reinforcing Programming Education Through Robotic Feedback", and/or U.S. application Ser. No. 15/582,924, filed 1 May 2017 and titled "System and Method for Toy Visual Programming", both of which are hereby incorporated in their entireties by this reference. However, the robot commands can include any suitable set of information and be otherwise transmitted to the robot.

The responses can be static (e.g., predefined word-for-word, predefined variable values, etc.), dynamic, or otherwise generated. In one variation, the response can be generated from a template (e.g., text template, image template, robot program instruction template, robot subroutine call template, script template, etc.) with response values that are automatically populated in real- or near-real time by the response module. In one example, the response template can include a series of responses (e.g., script) with a set of break points, wherein the series of responses are followed to the next break point regardless of the user input. This can function to confer a semblance of robot "independence" from the user. However, any other suitable response template can be used. The response templates can be universal, per robot personality, per user population, per user, per conversation client, per client instance, or otherwise associated with the client, user, and/or robot. The response values can include text, images, video, content identifiers (e.g., audio file names, URLs, pointer), endpoint identifiers (e.g., auxiliary system identifiers, robot identifiers, robot subsystem identifiers, etc.), robot subsystem control values (e.g., voltage, degrees of rotation, pulsation frequency, etc.), or values for any other suitable variable. The response and/or response value can be determined based on: the user input (e.g., user input keywords, sentiment, structure, class, semantics, length, frequency, computational meaning, or other input parameter determined using an interpretation module or other module, etc.), contextual information (e.g., current or historic robot sensor signals, news, social networking system posts, auxiliary system sensor signals, etc.), user history (e.g., user account information, historic input parameters), libraries (e.g., associated with the robot personality package, a selected game, the user input node, etc.), news (e.g., parent- or client-authorized news sources), social networking system information (e.g., Twitter, Facebook, etc.; content from parent- or client-authorized accounts), third-party content, associated user profiles (profile for current user, current user's connections, etc.), application store (e.g., applications that can also control the robot), past code (e.g., shared by user account, authored by user account, etc.), or from any other suitable data.

Determining the robot-associated response can include: retrieving the response pre-associated with the user input (or parameters thereof); randomly selecting a response from a library of responses; identifying response candidates associated with the user input, determining an engagement score for each response (e.g., based on response use frequency, similarity to past responses, etc.), and selecting a response with a high engagement score; or otherwise determining the robot-associated response.

In a first example, determining the response includes performing a tree search for the user input using regular expression matching to identify a node substantially matching the user input, then performing the template associated with the identified node. Subsequent interactions can be sub-branches of the identified node, be different branches of the same tree, be nodes on different trees, or be otherwise determined.

In a second example, determining the response includes detecting a "boredom" sentiment in the user input (e.g., using sentiment analysis), randomly selecting a new topic branch, and filling out a transitory template (e.g., "Did you know about *," where * can be replaced with keywords associated with the new topic branch) as the robot-associated response. For example, the method can use pattern matching with wildcards, and can use complete matching, partial matching (using wildcards) and non-matching (using a catch-all response list). However, the method can use any other suitable methodology. Alternatively or additionally, in response to detecting the "boredom" sentiment in the user input, determining the response can include adjusting the weights or scores assigned to the robot-associated responses, querying the remote computing system for updated responses, or otherwise adjusting the probability that the same response will be returned.

In a third example, determining the response includes: identifying a set of nodes (e.g., regular expressions) associated with a previously-presented response, matching the user input with one or more of the set of nodes (e.g., using regular expression matching), identifying a set of robot-associated responses associated with the matched node, and selecting a robot-associated response from the set (e.g., randomly, based on a set of rules, based on an engagement score for the response, etc.). In a specific example, the client can automatically query "Want to play a game?" and present input options associated with the query (e.g., selection icons), wherein the input options are each pre-mapped to a set of responses associated with the game. The user input can be an input option selection, wherein the robot-associated response can be selected from the set of pre-mapped responses (related examples shown in FIGS. 5 and 8B).

In a fourth example, determining the response includes: analyzing a pattern of user inputs (e.g., across multiple user inputs), inferring a purpose from the pattern (e.g., using pattern matching), determining an auxiliary client associated with the purpose, and generating a response by populating a suggestion template with a reference to the auxiliary client. In a specific example, this can include: determining that the user is attempting to program the robot through the conversation client, identifying a robot-programming client for the user (e.g., based on the user's experience level, etc.), determining a link to the robot-programming client, and populating a suggestion template with the link (e.g., "Looks like you're trying to create a state machine. It'll be easier with the Wonder™ app"). In a second specific example, this can include: determining that the user may be interested in using and/or modifying a particular previously-created (e.g., user created, predefined, etc.) program (e.g., subroutine, state machine, etc.), determining a link to run the program and/or edit the program in a robot-programming client (e.g., the client in which the program was created, a client capable of editing the program, a client selected as described above regarding the first specific example, etc.), and populating a suggestion template with the link (e.g., "Is this what you're looking for? You can open 'Maze Explorer' by pressing here."). In a third specific example, this can include: determining that the robot has not been associated with a user account and controlling the robot to guide the user through a predetermined series of steps to set up a user account through the client (e.g., wherein the next robot animation can be performed in response to determination that the user has completed a preceding step on the client. In a fourth specific example, the robot can guide the user through a predetermined series of customer support steps (e.g., tell the user what to select and what to enter) and/or automatically populate known robot-associated information (e.g., serial number, bug identifier). However, the response can be otherwise determined.

Determining the response can optionally be performed based on robot state and/or robot inputs (e.g., information sampled by one or more sensors of the robot), such as by incorporating perception of the robot state and/or environment into the conversation, which can function to enhance the user's perception that the conversation client is mediating a conversation with the robot itself. Preferably, the robot sends state and/or input information to the user device (e.g., conversation client), more preferably sending the information substantially as it was sampled but additionally or alternatively sending processed and/or otherwise distilled information, wherein the information is processed by the conversation client, such as described in U.S. application Ser. No. 15/636,439, filed 28 Jun. 2017 and titled "System and Method for Reinforcing Programming Education Through Robotic Feedback", and/or U.S. application Ser. No. 15/582,924, filed 1 May 2017 and titled "System and Method for Toy Visual Programming", both of which are hereby incorporated in their entireties by this reference. However, the robot state and/or inputs can additionally or alternatively be used by the robot and/or any other suitable device, and can additionally or alternatively be used in any other suitable manner.

In a first example, if the robot samples information indicative of an increase in distance between the robot and the user (e.g., based on camera data and/or rangefinder data indicative of the user moving away from the robot, audio data indicative of a user's voice intensity decreasing), and/or of the user moving out of the robot's region of perception (e.g., field of view of a camera), the response can be indicative of the movement of the user with respect to the robot (e.g., in response to increased distance, asking "Am I too far away?" or stating "Come back please!"; in response to loss of perception of the user's position, asking "Hey, where did you go?" and/or stating "I can't see you!"; etc.). In a second example, if the robot sampled information indicative of an object of interest in its environment (e.g., based on accelerometer data, contact sensor data, camera data, rangefinder data, etc.), and optionally in response to a user input asking about the robot's environment, such as "What can you see?", the response can be indicative of detection of the objects, such as by including a question and/or statement about the object (e.g., in response to contacting and/or coming close to an object during robot motion, asking "What is this?" or requesting "Could you please move this out of my way?"; in response to detecting a toy, stating "Cool toy!"; in response to detection of a dog and a user input asking about the robot's environment, stating "I see a dog!"; etc.). In a third example, the response can be indicative of historical data associated with robot operation (e.g., following a robot activity of more than a threshold duration, such as robot motion for more than 80% of the time during a 5 minute interval, stating "I'm tired! Can we hang out here for a little bit?"). However, the robot state and/or inputs can additionally or alternatively be used to determine responses in any other suitable manner, and/or can not be used.

Presenting the response S230 preferably functions to respond to the user input. The response is preferably presented to the user, but can additionally or alternatively be presented to any other suitable entities. Response presentation is preferably controlled (e.g., selected, controlled) by the conversation client, but can alternatively or additionally be controlled by the remote computing system, the robot, or by any other suitable system. For example, the conversation client can receive the user input, determine the response, and, when the response includes robot control, generate and send the robot commands to the robot with a performance time or in real- or near-real time.

Figure 13:
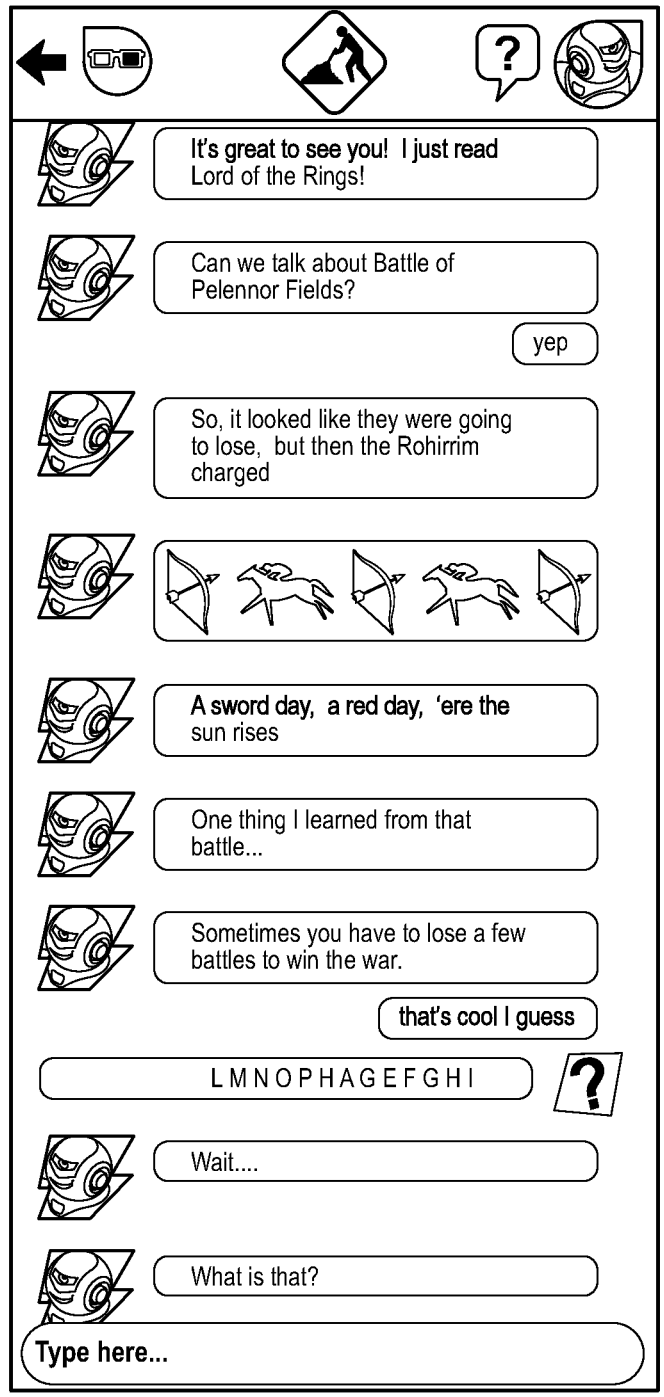
FIG. 13 is an example of a third-party participant response.

The response can be presented by the client, the robot, an auxiliary system, a third-party client (e.g., social networking system), or by any other suitable system. When the response is presented by a non-robot system, the response is preferably associated with a robot identifier on the non-robot system. For example, when a written response is presented on the conversation client, the written response is preferably associated with an image or icon of the robot (e.g., representing the physical robot, representing the robot personality, etc.). In another example, when a written response is presented on a social networking system, the response is preferably associated with a social networking account associated with the robot. Alternatively, the response can be associated with a third identifier (e.g., non-user and non-robot), such as a different color or icon, which can simulate a third party participant in the conversation (example shown in FIG. 13). However, the response can be otherwise associated with the robot.

Response presentation can additionally be coordinated between multiple systems. For example, robot actions can be coordinated with client actions. In a first variation, robot actions and client actions can be concurrently performed. For example, the robot can rotate in a circle while the client displays, "I'm turning around." In a second variation, robot and client actions can be part of the same sequence. For example, the client can display, "Watch this!," followed by robot animation. The client can transmit the robot animation command to the robot after "watch this!" is displayed, or transmit the robot animation command with a performance time scheduled after the "watch this!" display time. In a third variation, the robot and client actions can be linked in the same overall sequence, with intervening user inputs. In a specific example, the client can request a user to enter an identifier (e.g., name) for an object to the user's left (e.g., also identified using the robot's on-board sensors), then use the object as a prop in a story sequence played out by the client and/or robot (example shown in FIGS. 12A-12D). However, any suitable response can be determined in any other suitable manner.

Presenting the response can optionally include presenting a transitory output between receiving the user input and presenting the determined response. This can function to simulate a "thinking" period or "response" period, which can anthropomorphize the robot and/or otherwise enhance the user's experience during use of the conversation client (e.g., creating and/or enhancing the illusion that the user is conversing with the robot via the conversation client). The transitory output preferably includes a robot animation (e.g., associated with a transition sequence, such as wherein the robot receives the transition sequence from the client and performs the robot animation based on and in response to receiving the transition sequence) and a client output (e.g., animation), both preferably indicative of response generation in progress (e.g., analogous to "thinking" and/or "typing" actions performed by a human conversation partner), but can alternatively include any other suitable output or combination thereof. In a specific example (e.g., as shown in FIG. 6), the transitory output can include a typing animation at the client (e.g., bouncing periods, ellipsis, thought bubble, etc.) concurrently presented with a robot animation including a robot head tilt (e.g., up, down, diagonally upwards, etc.) and a sound animation (e.g., "hmm," typing sounds, etc.). However, the transitory output can additionally or alternatively include any other suitable output.

Transitory output parameters and/or performance is preferably determined by and/or controlled by the client, but can alternatively be controlled by the robot or by any other suitable system. The transitory output parameters can include: the output duration, robot subroutine selections, robot subroutine variable values, client animation variable values, or any other suitable parameters. The parameter values can be determined based on the user input (e.g., the parameter value associated with the user input type), the selected robot personality (e.g., selected from a library of values associated with the personality), robot sensor values, the interaction history, or any other suitable data.

For example, the transitory output animation duration can vary as a function of user input difficulty (e.g., difficulty associated with the user input type by a managing entity), robot-associated response length, robot-associated response generation time, or duration specified by the robot personality pack. In a second example, each user input or robot-associated response is associated with a set of predetermined transitory output parameter values. In a third example, the transitory output parameter values are determined based on the current and/or previous robot sensor signals and/or robot state (e.g., as further described above). In a specific example, the transitory output can include presenting, "Hold on, I don't text and drive" when the robot wheels are rotating above a threshold rate or the robot accelerometer values exceed a threshold value. However, the transitory output parameter values can be otherwise determined.

Figure 9:
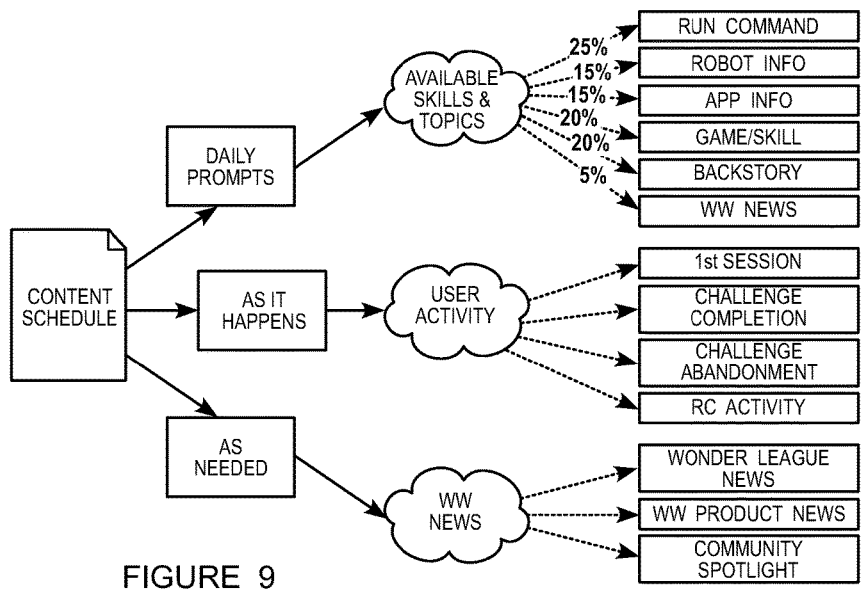
FIG. 9 is an example of automatic response presentation rules.
Figure 10:
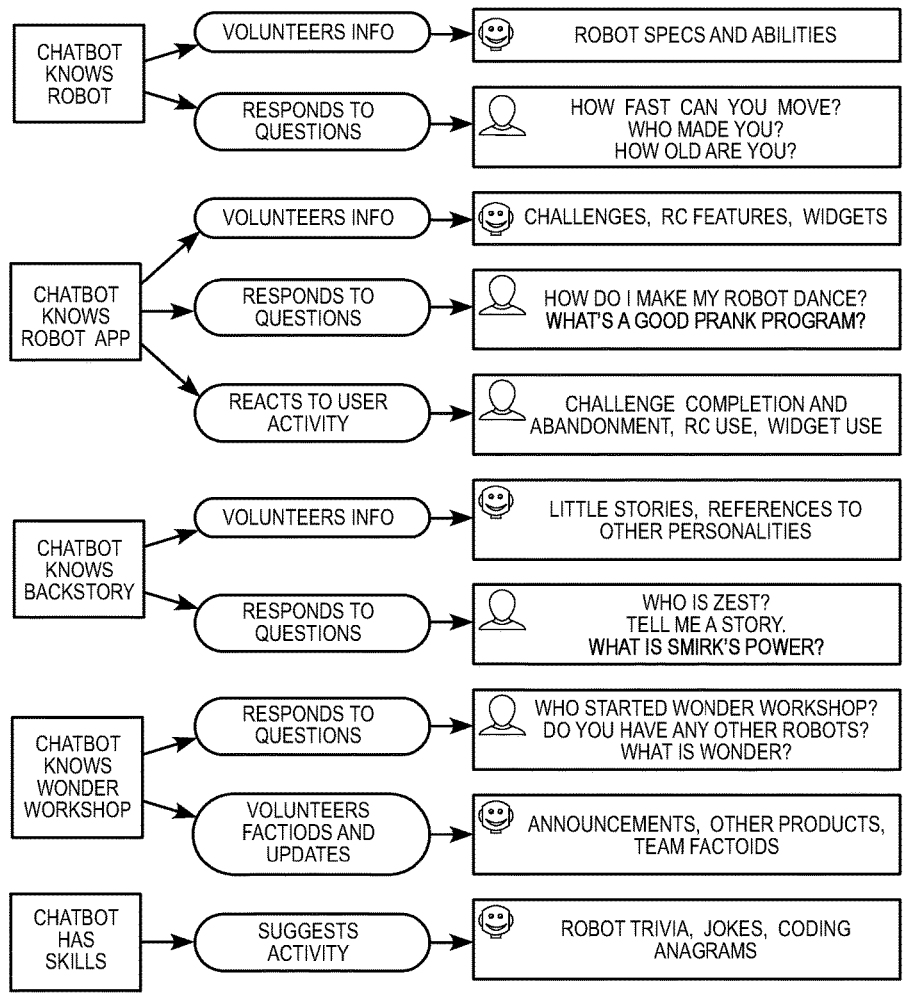
FIG. 10 is an example of a knowledge base.

The method can optionally include notifying the user, which functions to re-engage the user. The notification can be a robot-associated response (e.g., a high-level node within the response module), be generated using a template and a knowledge base (e.g., personality library, news source, user account information, etc.; example shown in FIG. 10), be selected from a set of predetermined phrases or animations (e.g., "Hey!", "How's it going?," etc.), or be any other suitable notification (examples shown in FIG. 8D). The notification can be presented by the client, the robot, or by any other suitable system. The notification can be automatically presented after a predetermined duration from the last input receipt, according to a schedule (e.g., as shown in FIG. 9), after a contextual parameter is satisfied (e.g., the current date matches a birthday, the robot is moved, a light is turned on in the house, etc.), or at any other suitable time.

Figure 4:
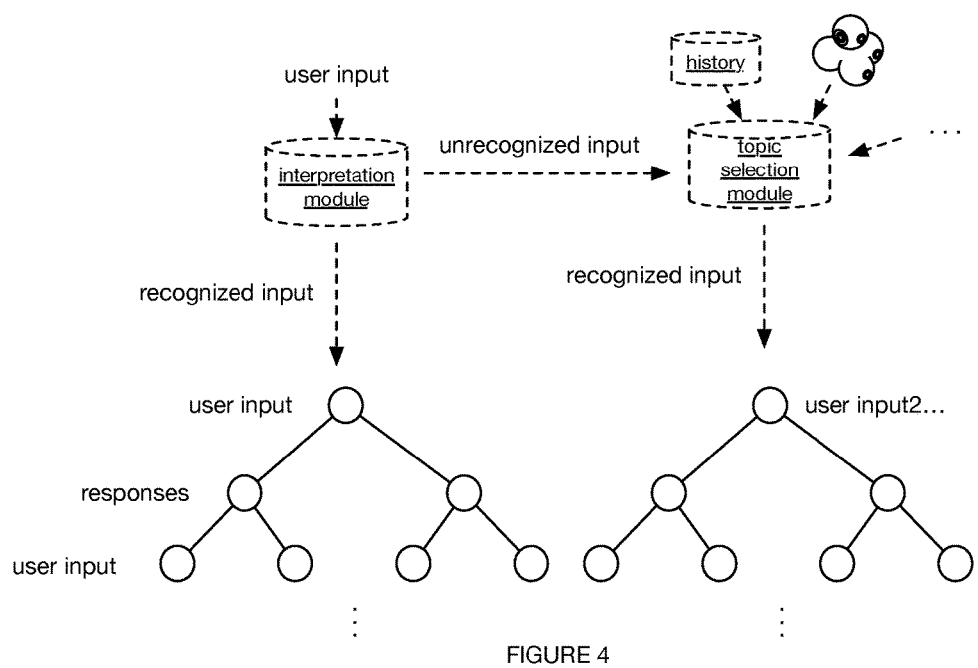
FIG. 4 is a schematic representation of managing an unrecognized input.
Figure 11:
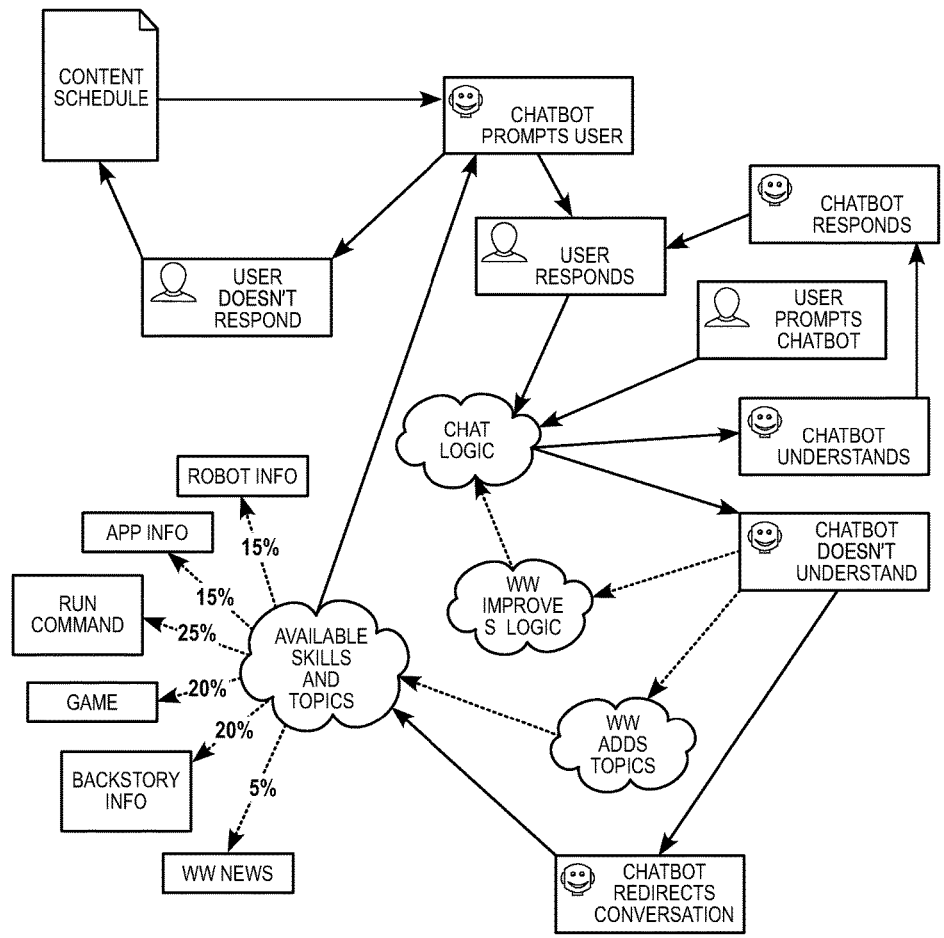
FIG. 11 is an example of the method.
Figure 12A:
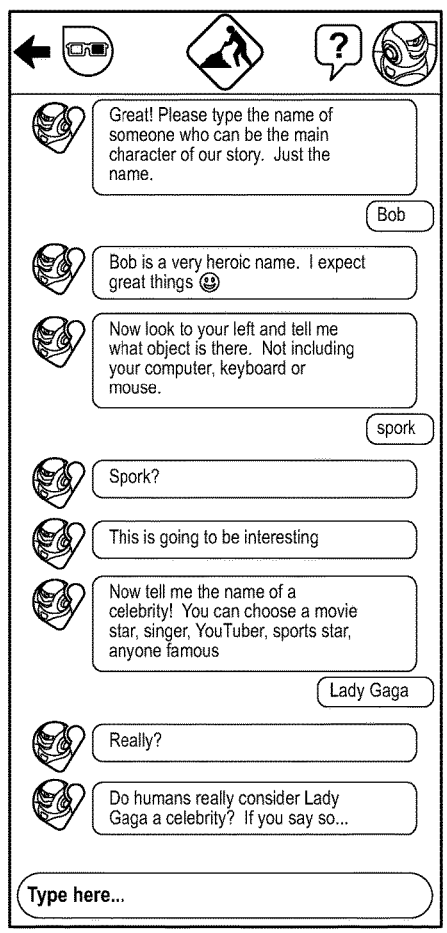
Figure 12B:
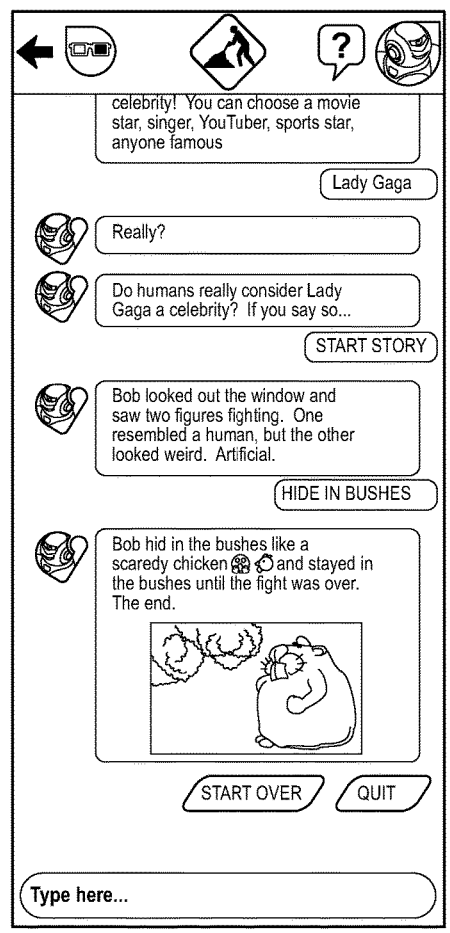

The method can optionally include determining a redirecting response in response to receipt of an unrecognized input, which functions to re-direct the conversation from a thread without robot-associated responses to a thread with robot-associated responses (examples shown in FIGS. 4 and 11). A recognized input can be a user input associated with responses within the response module, and an unrecognized input can be a user input without associated responses (and/or without responses above a threshold score or probability) within the response module. In a specific example, an unrecognized input can be a user input that does not match a pattern in the response tree index. However, recognized and unrecognized inputs can be otherwise defined. The redirecting response be generated using a template (e.g., "I'm not sure, let's talk about * instead", "That's not me! I'm *" *") and a reference (e.g., replacing * in the template) to a robot-associated response within the response module (e.g., a high-level node within the response module), be selected from a set of predetermined phrases or animations, or be any other suitable notification. The redirecting response can be randomly selected, selected based on user preferences (e.g., of the current user account, associated user accounts), be a response associated with the last recognized input (e.g., a node connected to or related to the last node used to generate a response) or otherwise determined.

Figure 7:
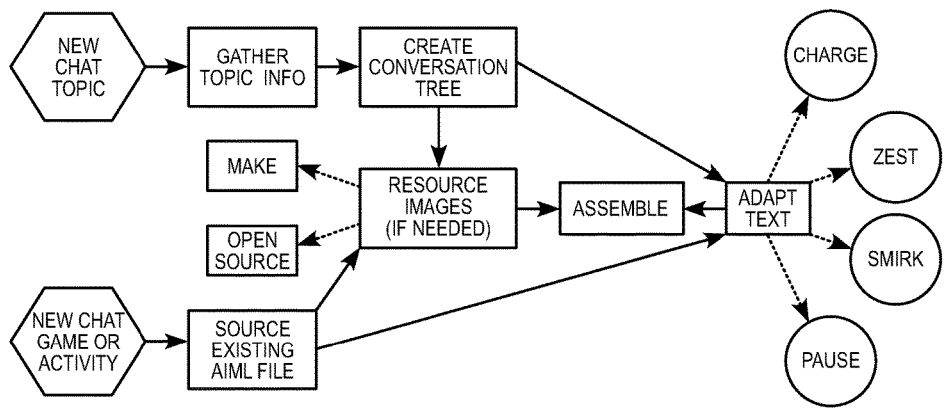
FIG. 7 is an example of updating the response module.
Figure 8E:
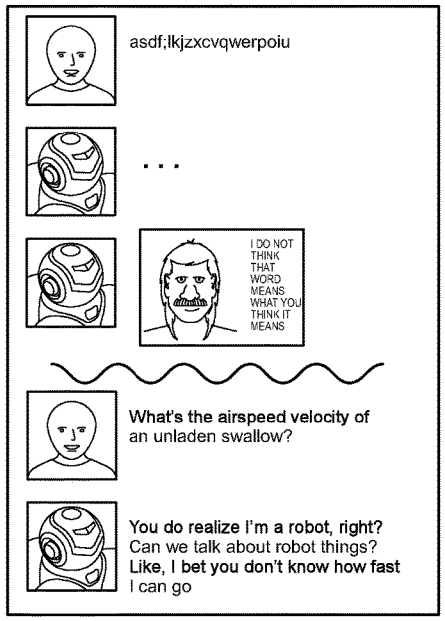
Figure 8F:
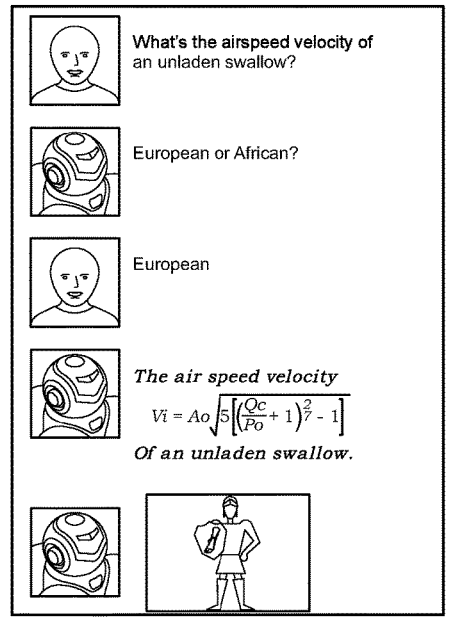
Figure 8G:
Figure 8H:

The unrecognized inputs can optionally be stored, which functions to provide a database that can subsequently be analyzed to determine new user inputs and/or new responses for an updated response module (examples shown in FIGS. 7 and 8E-8F). The unrecognized input storage can be for a user account, for a plurality of user accounts, or for any suitable set of users. The new user inputs and/or responses can be determined manually, by the learning module(s), or otherwise determined.

The recognized inputs can optionally be stored, which functions to build a user reaction history. This history can be used to influence future response selections (e.g., weight unselected responses higher than previously selected responses), be analyzed for sentiment analysis (e.g., response popularity for a user or user population to determine whether the response should be weighted higher for other users), or otherwise used.

One or more elements of the method can optionally be repeated any suitable number of times. If a new user input is received S210 (e.g., after presenting the response S230, such as wherein the user is responding to the presented response with the new user input; wherein the new user input is associated with a different conversation or a change in conversation topic; etc.), the method preferably includes repeating S220 and S230 based on the new user input (and optionally, based on the previous conversation elements, such as based on the current state in the conversation tree). For example, the conversation can continue (e.g., by repeating S210 through S230) indefinitely, until a time-out criterion is met (e.g., no new user input is received for more than a threshold period of time, such as 10 s, 1 min, 2 min, 5 min, 10 min, 15 min, 30 min, 1 hr, 2 hr, 3 hr, 5 hr, 8 hr, 1 day, 2 days, 3 days, 1 week, 1-10 s, 10-60 s, 1-10 min, 10-60 min, 1-10 hr, 10-100 hr, 100-500 hr, etc.; the robot is disconnected from the user device for more than the threshold period of time; etc.), until a conversation end trigger is satisfied (e.g., the end of a conversation tree is reached; the conversation client stops execution on the user device; the user selects an "end conversation" option via the robot and/or conversation client; S210 through S230 are repeated for a threshold number of times, such as 5, 10, 25, 50, 100, 1-5, 5-25, or 25-100 times; etc.), and/or can continue over any other suitable period.

5. Example Games.

The system and/or method can optionally function to implement one or more interactive games, such as described above. The games can optionally be organized into one or more groups (e.g., expansion packs). In some embodiments, each group is associated with a personality (e.g., different personality for each group), wherein responses to user inputs while playing games of a group (and/or while selecting a new game within a group, otherwise interacting within the context of a group, etc.) are preferably determined based on the associated personality.

In one variation, the groups include one or more of: an alien contact group, featuring an alien from Zworp (e.g., wherein the personality for the group is associated with the alien) who is figuring out what to do with Earth (with the user's help); a treasure hunt group, featuring a sentient Treasure Map app who speaks like a rhyming pirate (e.g., wherein the personality for the group is associated with the Treasure Map); and/or a hacker hijack group, featuring a full-of-himself hacker who is trying to take over the robot (e.g., wherein the personality for the group is associated with the hacker and/or the un-hijacked robot).

In this variation, the alien contact group can include one or more of the following games: a gamebook-style (e.g., choose your own adventure) story in which an alien is communicating through the robot, seeking the user's help deciding whether to invade Earth or give it cool tech; a yahtzee-style game in which the alien is racking up points by abducting Earth objects; an anagram game in which the alien is snooping on personal texts of humans, and the user helps decipher scrambled words to complete the messages (e.g., wherein, if all the messages are combined, there is a hidden phrase); a hangman game in which the user is presented with one or more bad photos of Earth objects (e.g., ostensibly captured by the alien's drones), like a close-up of a dog's nose, and the user helps figure out what the objects are (e.g., wherein the user gets 7 "lives", and each time a life is lost, such as by an incorrect guess, a reaction is performed by the robot); a number drop puzzle game in which the user needs to sort numbers into rows so that each row equals 32, thereby filling the 4 rocket engines needed by the alien to leave Earth; a mad lib story in which the user provides words that become part of the alien's report about Earth back to its superiors; a hangman game in which the user has to decode emoji phrases that relate to space and aliens (e.g., wherein each wrong guess causes a reaction on the robot); a puzzle that consists of a series of if/then questions, with each correct answer adding a letter to a phrase (e.g., wherein, for one or more of the questions, the user can and/or must observe the robot's actions in order to respond correctly, such as by determining their response based on the robot action); a puzzle in which the user answers puzzle questions to fix the robot, wherein each correct answer helps fix the robot (e.g., moving it another step toward its normal state); and/or a hangman game using the names of movies about alien contact.

In this variation, the treasure hunt group can include one or more of the following games: a gamebook-style (e.g., choose your own adventure) story in which the user and the robot, with the help of the pirate map, search for treasure by solving a series of clues; a yahtzee-style game with the theme of sunken treasure; an anagram game with clues for an at-home treasure hunt (e.g., wherein the answers are combined to determine a code word at the end); a hangman game solving the names of famous pirates (e.g., wherein each wrong guess causes a reaction on the robot); a number drop game using the theme of digging for treasure, wherein the user must fill each bag with the right amount of treasure without overloading it; a mad lib story involving a treasure map that the player helps design through mad lib selections; a hangman game solving various kinds of codes; a puzzle that consists of a series of if/then questions (e.g., as described above regarding the alien contact group); a choose-your-path game with riddles and clues to help the user choose the correct path and collect gold; and/or a rolling game, wherein the user rolls dice (e.g., simulated by the client) to try to get a match of 3 identical treasures to keep.

In this variation, the hacker hijack group can include one or more of the following games: a gamebook-style (e.g., choose your own adventure) story in which a hacker has taken over the robot, and the user has to break through his 3 firewalls to get the robot back; a rolling game (e.g., as described above regarding the treasure hunt group) in which the user tries to get a match of 3 identical devices to hack the hacker; an anagram game involving l33t speak; a hangman game using hacker jokes; a number drop game (e.g., as described above regarding the treasure hunt group) associated with filling sandwiches with the right amount of ingredients; a mad lib story in which the user is messing around with the hacker's post to an online hacker forum; a hangman game solving various kinds of codes; a puzzle that consists of a series of if/then questions (e.g., as described above regarding the alien contact group); a puzzle in which the user answers puzzle questions to fix the robot (e.g., as described above regarding the alien contact group); and/or a puzzle game in which the user identifies bad code to remove in order to stop loops.

However, the games can additionally or alternatively include any other suitable games organized in any other suitable manner, and/or include no games.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for simulating conversation with a robot, the method comprising:
   a) at a user device separate from the robot, receiving, from a user, a conversation input associated with a conversation;
   b) at the user device, in response to receiving the conversation input:
      sending, to the robot, a control instruction associated with robot simulation of participation in the conversation; and
      based on the conversation input and a response module of the user device, determining a response;
   c) at the robot:
      receiving the control instruction; and
      based on the control instruction, controlling the robot to perform an action associated with robot simulation of participation in the conversation;
   d) after controlling the robot to perform the action, at the user device, presenting the response; and
   e) repeating a) through d) until a conversation input is not received from the user for more than a threshold time interval.

2. The method of claim 1, further comprising, before a), at the robot:
   retrieving a personality module, wherein the personality module is associated with the response module in a one-to-one correspondence; and
   automatically controlling the robot based on the personality module.

3. The method of claim 1, wherein performing b) is not based on robot state and is not based on measurements sampled by the robot.

4. The method of claim 1, wherein the response module comprises a conversation graph.

5. The method of claim 1, further comprising, at a remote server separate from the user device and from the robot:
generating an AIML tree index based on an AIML graph; and
sending the AIML tree index to the user device;
wherein the response module comprises the AIML tree index.

6. The method of claim 5, further comprising, after e):
at the remote server:
determining a modification to the AIML graph;
after determining the modification, generating an updated AIML tree index subset; and
sending the updated AIML tree index subset to the user device;
at the user device:
receiving the updated AIML tree index subset; and
determining an updated AIML tree index based on the AIML tree index and the updated AIML tree index subset; and
after determining the updated AIML tree index, repeating a) through e), wherein the response is determined based on the updated AIML tree index.

7. The method of claim 1, further comprising, at the user device, before presenting the response, presenting an output indicating of a waiting condition.

8. The method of claim 7, wherein presenting the output indicating of the waiting condition is performed after determining the response.

9. The method of claim 7, wherein presenting the output indicating of the waiting condition is performed substantially concurrent with controlling the robot to perform the action.

10. The method of claim 1, wherein presenting the response comprises displaying a text representation of the response.

11. The method of claim 1, wherein presenting the response comprises outputting a spoken language representation of the response.

12. The method of claim 1, further comprising:
at the user device:
based on the conversation input and the response module, determining a second control instruction; and
after sending the control instruction to the robot, sending the second control instruction to the robot; and
at the robot:
receiving the second control instruction; and
after controlling the robot to perform the action, based on the second control instruction, controlling the robot to perform a second action associated with the response.

13. A method for simulating conversation with a robot, the method comprising:
at the robot:
retrieving a personality module; and
automatically controlling the robot based on the personality module;
at a user device separate from the robot;
selecting a response module associated with the personality module;
receiving a conversation input associated with a conversation with a user;
in response to receiving the conversation input, sending, to the robot, a control instruction associated with robot simulation of participation in the conversation; and
based on the conversation input and the response module, determining a response;
at the robot, after automatically controlling the robot based on the personality module:
receiving the control instruction; and
based on the control instruction, controlling the robot to perform an action associated with robot simulation of participation in the conversation; and
after controlling the robot to perform the action, presenting the response to the user.

14. The method of claim 13, wherein automatically controlling the robot based on the personality module comprises:
controlling the robot to output a visual output; and
controlling the robot to move.

15. The method of claim 13, wherein the personality module is associated with the response module in a one-to-one correspondence.

16. The method of claim 13, wherein presenting the response to the user comprises, at the user device, displaying a text representation of the response.

17. The method of claim 13, wherein presenting the response to the user comprises, at the robot, outputting a spoken language representation of the response.

18. The method of claim 13, further comprising, at an audio sensor of the robot, sampling an audio input comprising the conversation input, wherein the user device receives the conversation input from the robot.

19. The method of claim 13, further comprising, at a remote server separate from the user device and from the robot:
generating a parse tree index based on a conversation graph; and
sending the parse tree index to the user device;
wherein the response module comprises the parse tree index.

20. The method of claim 19, wherein the conversation graph is an AIML graph.

* * * * *

UNITED STATES PATENT AND TRADEMARK OFFICE
CERTIFICATE OF CORRECTION

PATENT NO. : 10,239,202 B1
APPLICATION NO. : 16/132162
DATED : March 26, 2019
INVENTOR(S) : Leisen Huang et al.

Page 1 of 1

It is certified that error appears in the above-identified patent and that said Letters Patent is hereby corrected as shown below:

In the Claims

Column 19, Line 10, delete "e):" and insert --e),-- therefor

Signed and Sealed this
Third Day of March, 2020

Andrei Iancu
*Director of the United States Patent and Trademark Office*